H. B. SLATER.
METHOD OF EXTRACTING METALS FROM THEIR ORES.
APPLICATION FILED SEPT. 2, 1913.
1,195,616.
Patented Aug. 22, 1916.
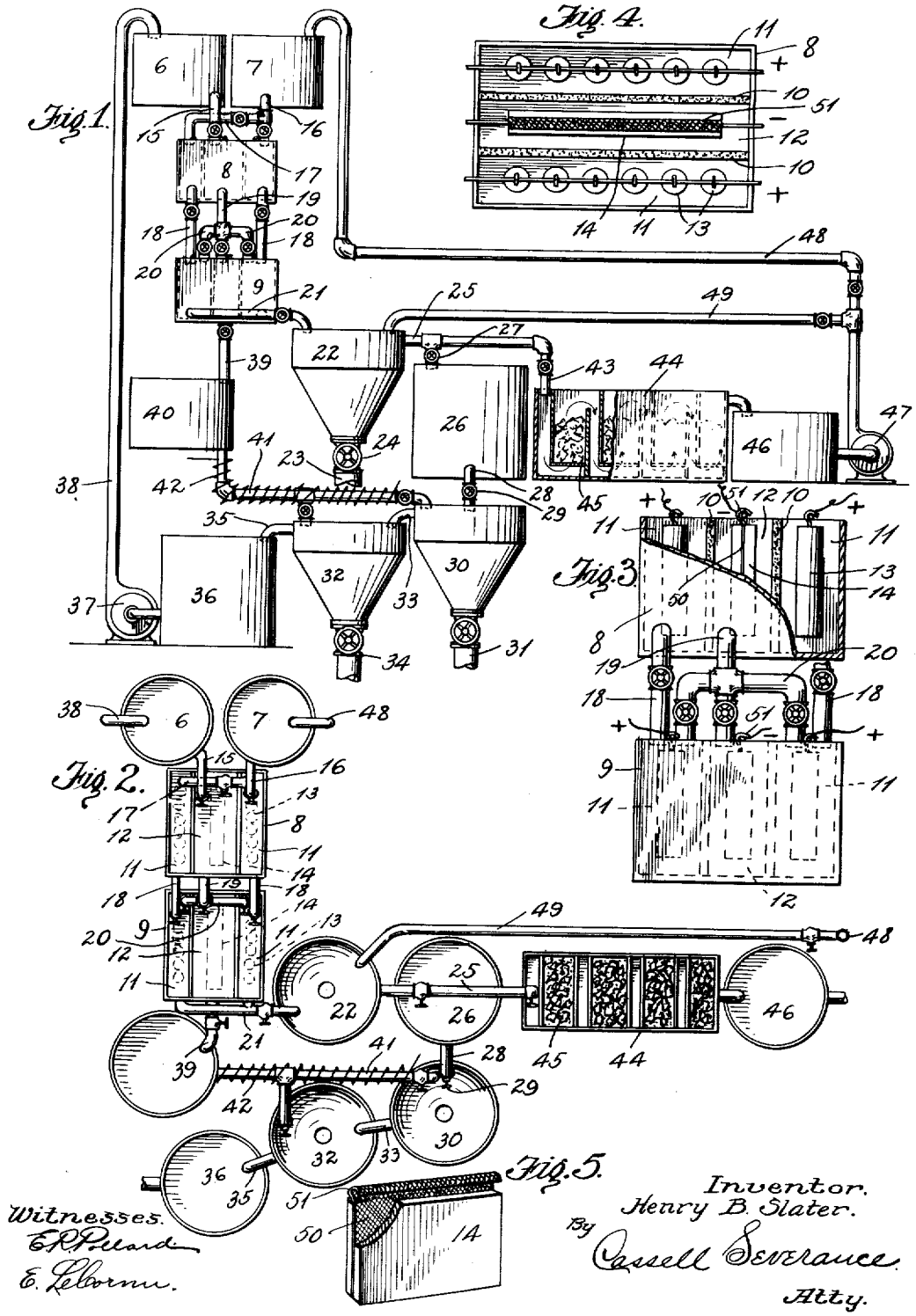

UNITED STATES PATENT OFFICE.

HENRY B. SLATER, OF RIVERSIDE, CALIFORNIA.

METHOD OF EXTRACTING METALS FROM THEIR ORES.

1,195,616.   Specification of Letters Patent.   Patented Aug. 22, 1916.

Application filed September 2, 1913. Serial No. 787,598.

*To all whom it may concern:*

Be it known that I, HENRY B. SLATER, a citizen of the United States, residing at Riverside, in the county of Riverside and State of California, have invented certain new and useful Improvements in Methods of Extracting Metals from Their Ores, of which the following is a specification.

This invention relates to improvements in processes or methods for extracting metals from their ores and has particular reference to the employment of a solution which is furnished with oxidizing and dissolving ingredients for affecting the metallic contents of the ore and is also furnished means for the precipitation and separation of the metals dissolved from the said solution.

The present method is designed to include in a complete cyclic treatment of the metal bearing substances, the process described and claimed by me in Letters Patent No. 1,066,855 granted to me on July 8th, 1913, where I employ a solution in which cathode products in an electrolyzer are added to the anode products, furnishing the solution with agents capable of oxidizing the sulfur ore for sulfur therefrom. In the present method, also, a means of precipitating metallic copper is set forth making the process more complete in that it yields the metal as a final product.

The process of the present invention is especially applicable to the extraction of copper from that class of ores in which the gold and silver values are usually low and in which the copper exists for the most part in the form of chalcocite with, perhaps, some chalcopyrite and often some of the oxids of copper and iron. It is, also, well adapted to the extraction of the copper from that class of ores, chiefly silicates, which carry gold and silver in a sufficient amount for profitable treatment by cyanidation, but for the presence of the copper. The removal of the copper by this process leaves the ore in the most suitable condition for the treatment thereof by cyanid of potassium for the extraction of the gold and silver values, especially after a wash with a dilute solution of the caustic soda produced at the cathode in the electrolyzer.

It is an object of the invention to provide a solution for the treatment of ores in which copper exists in combination with sulfur, which solution shall be capable of yielding chlorin and contributing iron for facilitating the furnishing of the solution with oxidizing compounds and dissolving agents, the said solution also being capable of yielding a reagent by which the values may be precipitated and separated from the solution and the chlorin yielding portion of said solution be regenerated for use again and further the iron be separated from the solution and returned thereto at a proper point in the operation for reuse, all in a cyclic manner. The use of such a method enables me to oxidize ores in which copper is combined with sulfur, thus liberating the sulfur and thereby eliminating the necessity for a preliminary roasting, or calcining of the ore.

It is, also, an object of the invention to produce such a solution which, by electrolytic treatment, becomes a lixiviant furnished with oxidizing agents and chlorin liberating compounds. The continued electrolysis of the solution acts to further enrich the anode solution with oxidizing compounds of a still more active and unstable character by the formation therein of chlorin monoxid, hypochlorous acid, hypochlorate of sodium, chlorate of sodium, chlorous acid, chloric acid and chlorin peroxid. The solution thus treated is by this method also enriched with certain of its more active constituents from the ore itself. In carrying out this method I preferably employ sodium chlorid as a basic carrier medium and as a means for yielding the chlorin needed and, under electrolytic treatment, permitting of the formation of oxidizing agents and chlorin liberating ingredients. In connection therewith a large percentage of chlorin is brought into the solution through the intervention of iron, properly introduced into the solution, the chlorin being in such unstable combinations as to be readily yielded up for dissolving metal values treated by the solution. The carrier medium facilitates the conversion of the copper content of the ore to copper oxid and further furnishes a reagent for separating the copper oxid from the solution, regenerating and restoring the sodium chlorid for use again and also restoring the iron for further use, all in a cyclic manner.

It is a still further object of the invention to use sodium hydroxid, formed in the negative compartment of the electrolyzer, first as a purifier of the carrier solution by using it to precipitate the iron from the solution of iron and copper obtained from the ore, second as a precipitant of the copper as cupric hydroxid, and third to reproduce the sodium chlorid by its combination with the chlorin from the iron and copper.

It is also an object of this invention to use the cupric oxid in forming the negative electrodes for the electrolyzer, the same serving the double purpose of a depolarizer and the reduction of the cupric oxid to metallic copper through the agency of the hydrogen given off at the cathode.

It is found that the action of the cupric oxid as a depolarizer very materially reduces the total of electric energy required for the decomposition of the sodium chlorid, and as the hydrogen at the same time reduces the cupric oxid to metallic copper, the economic importance of this feature is quite obvious. Its importance is the greater in connection with the use of a chlorid solution as against a sulfate solution as the extraction of the copper from a sulfate solution by electrodeposition offers no great difficulties. A chlorid solution on the contrary, is untractable and difficult to control, when an attempt is made to extract the copper therefrom by electrolysis, and, in fact, it is all but impossible to extract the last of the copper from a chlorid solution electrolytically at a profit.

The accompanying drawing will serve to illustrate quite clearly the method employed in carrying out the process and shows a preferable arrangement of such an apparatus. It should be understood, however, that the invention is not limited to the employment of any given form of apparatus, either for the formation of the lixiviant or the treatment of the ore. Agitators may be used, a system of percolation may be employed, or a system of continuous decantation as found most desirable, all within the spirit and scope of the invention.

In the accompanying drawing: Figure 1 is a side elevation of a preferred form of apparatus adapted for carrying out the method of the present invention. Fig. 2 is a top plan view of the same, the return pipes for the sodium chlorid and iron solutions being broken away. Fig. 3 is a detail view partially in elevation and partially in section of the electrolyzer, showing the same upon an enlarged scale. Fig. 4 is a top plan view of one cell of the electrolyzer. Fig. 5 is a detail view showing the copper oxid shaped into a cathode in electrode, portions being broken away to expose a wire netting or expanded metal support.

The method of carrying on the process of the present invention will now be described in detail reference being had to the accompanying drawing in which 6 indicates a vat for containing a solution of sodium chlorid, 7 a vat for containing a solution of sodium chlorid, ferrous chlorid and also having ferric hydroxid in suspension in the mixture. Arranged in convenient relation to the said vats 6 and 7 is an electrolyzer, preferably having two cells 8 and 9, the cell 8 being connected by suitable piping with the vats 6 and 7 and the two cells of the electrolyzer being also interconnected by suitable valve controlled piping, as shown in Figs. 1 and 2. Each of said cells of the electrolyzer is preferably provided as shown in Figs. 3 and 4 with three compartments, porous diaphragms 10 being employed to separate them, but the cell is in principle a two part cell as the outer compartments 11 of each cell are positive or anode compartment while the center compartments 12 are cathode compartments. In the anode compartments electrodes 13 of suitable material are located and arranged to be connected with the positive pole of a source of electrical energy. In the cathode compartment, a cathode 14, preferably of copper oxid is mounted and connected with the negative terminal of the source of electrical energy not shown. The cell 8 is so located that piping 15 may deliver sodium chlorid from the vat 6 into the cathode compartment 12, while the mixture in the vat 7 may be conducted through pipings 16 and 17 into the anode compartments 11 of the said cell 8.

The second cell 9 of the electrolyzer is preferably constructed like the first cell and provided with the same diaphragms and anodes and cathodes. The anolyte may be conducted into the anode compartments 11 of the second cell 9 through pipes 18, while the catholyte may be conducted from the cathode compartment of the cell 8, some of it through piping 19 to the cathode compartment of the cell 9 and some of it through branch piping 20 into the anode compartments of the said second cell 9. In this way products of the catholyte in the first cell may be mixed with the anolyte of the second cell.

The anolyte from the compartments of cell 9 is led through piping 21 into an agitator and dewaterer 22, which may be of any of the common forms of such devices upon the market. The dewaterer is preferably provided with an outlet pipe 23 at its lower end controlled by a valve 24. The solution from the agitator 22 may be led through a pipe 25 into a settling tank or vat 26. A valve 27 controls the discharge of the materials into said vat 26. From the vat 26 the materials are led through piping 28 controlled by valve 29 into another agitator and dewaterer 30. The agitator 30 is also provided with a valve controlled outlet 31. The liquids may be further led into an adjacent agitator and dewaterer 32 through a pipe 33, said agitator having a valve controlled outlet 34. From the upper part of the agitator 32 solutions may be passed through pipe 35 into a vat 36. A pump 37 connected with the vat 36 is capable of forcing materials (sodium chlorid) through piping 38 back to the vat 6.

Since it is desired to employ cathode ingredients in the agitators 30 and 32, a pipe 39 is provided for directing the catholyte from the cell 9 of the electrolyzer into a receiving vat 40. A pipe 41 leads from the vat 40 to the agitators 30 and 32, valve controlled branches thereof being used for directing the substances into each of the said agitators. In order to heat the materials passing through the pipe 41 when desired, a heating coil 42 surrounds the said pipe 41, said coil being adapted for the application of electricity or steam, as preferred in heating the said pipe 41.

In order to insure the saving of all traces of copper from the wash water of the agitator, the said wash water may be led through valve controlled piping 43 into a precipitating box 44. The said precipitating box is preferably divided by partitions into compartments 45 having perforated bottoms, the said compartments being adapted to contain iron (usually scrap), the construction and arrangement being such that the wash water may be caused to flow upwardly through the bottoms of said compartments successively and overflow into the next compartment, thus being passed through the scrap iron, which will precipitate the copper of the wash water as cement copper. From the precipitating box 44 the solution flows into a vat 46 and a pump 47 is employed for taking the solution therefrom and driving it through piping 48 back to the vat 7. A branch pipe 49, also valve controlled, connects the pipe 48 with the agitator 22 so that solutions may be directed from the pump 47 into said agitator if desired.

As heretofore indicated the cathodes of the electrolyzer are preferably formed of copper oxid and that generally derived from the copper hydroxid which is produced in carrying out the process. The copper hydroxid when removed from the solution is dried sufficiently to be pressed into the form of a cake or block of copper oxid of suitable size or shape to act as a cathode. The copper oxid is preferably shaped upon an iron webbing 50, which is thus embedded in the center portion of the cathode. The upper edge of the webbing is allowed to project beyond the copper oxid and is bent in the form of a hook 51 so as to facilitate the suspending of the cathode in the electrolyzer.

The process in carrying out the method involved in the present invention includes the following steps: 1st. Preparation (including all of the steps therein) of a lixiviant. 2nd. Treatment of the ore with the lixiviant. 3rd. Separation of the solution from the pulp or ore and thereby bringing away the values, in this case copper, with such impurities as are soluble in the lixiviant. 4th. Precipitation of the iron and other impurities. 5th. Separation of the copper from the solution. 6th. Preparation of the cupric oxid for the cathodes.

In the preferred form of the invention the carrier solution of sodium chlorid is placed in the vat 6 while a solution of sodium chlorid, mixed with a solution of metallic chlorid of a lower order, preferably ferrous chlorid, and capable of being raised to a higher order, say to ferric chlorid, is placed in the vat 7, in which solution is also mixed and held in suspension a metallic hydroxid, as for instance ferric hydroxid. For the sake of describing one mode of carrying out the process we will consider the vat 7 as having its solution composed of sodium chlorid, ferrous chlorid and ferric hydroxid mixed therein in suspension. The solution from the vat 6 is allowed to flow into the negative or cathode compartment 12 of the cell 8. The solution from the vat 7 is allowed to flow into the positive or anode compartments of the said cell 8. When the cell is filled an electric current is passed through the same and the sodium chlorid will be decomposed, chlorin being liberated at the anode and sodium at the cathode, as per the following reaction:

(a) 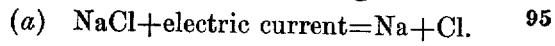 NaCl+electric current=Na+Cl.

The sodium liberated will decompose the water of the solution and combine with a part of its constituents as follows:

(b)  Na+H₂O=NaOH+H.

Hydrogen will thus be liberated, which will combine with the oxygen of the cupric oxid of which the cathode is preferably formed as hereinbefore stated whereby water and metallic copper (the cathode being gradually changed to metallic copper as the process proceeds) will be formed thus:

(c) 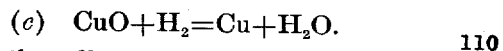 CuO+H₂=Cu+H₂O.

From the cell 8 of the electrolyzer the solutions are permitted to flow into the compartments of the cell 9 through the piping heretofore described. All of the anolyte from cell 8 flows into the anode compartments 11 of the cell 9 and most of the catholyte from the cell 8 flows through pipe 19 into the cathode compartment of the cell 9, but some of the catholyte is allowed to flow through the branch pipes 20 into the anode compartments of the said cell 9. It should be understood that the mixture in the vat 7 is restricted as to the proportions of iron that it shall contain when admitted to the electrolyzer. It is desirable and preferable that the total iron employed, both in the form of ferrous chlorid (FeCl₂) and in the form of ferric hydroxid (Fe(OH)₃) taken together, shall not exceed 0.5%. The sodium chlorid in such case should not exceed 15%. Larger quantities of these substances may be used, but I find the best results are obtained with the weaker solution.

As soon as the ferrous chlorid in the anode compartments of the cell 8 has all been raised to ferric chlorid by the chlorin liberated at the anode, the solution with the ferric hydroxid, still in suspension, is allowed to run into the cell 9 of the electrolyzer entering the anode compartments thereof, the catholyte from the cell 8 also being allowed to flow into the cathode and anode compartments of said cell 9, that portion going into the anode compartments being regulated in amount in accordance with the class and kind of ore to be treated, as may be ascertained by the operator.

The reactions in the electrolyzer cells will be as follows: in the cell 8 at the anode we will have chlorin, as above indicated by formula (a), which chlorin will combine with the ferrous chlorid to form ferric chlorid and at the cathode, as shown in formula (b), the hydrogen liberated will combine with the oxygen of the cupric oxid (CuO) to form water and reduce the cupric oxid to metallic copper, as heretofore indicated in formula (c).

The sodium hydroxid formed in the cell 8 mixed with sodium chlorid, is allowed to flow into the cell 9 and that which flows into the cathode compartment undergoes the same treatment as it did in the cell 8. That which flows into the anode compartment of cell 9 will meet the chlorin being liberated at the anode and form sodium hypochlorite and sodium chlorid, as per formula:

(d) $2NaOH + 2Cl = NaOCl + NaCl + H_2O$.

Some chlorates will be formed and some hydrochloric acid, as the nascent chlorin will decompose the water with the following result:

(e) $2Cl + H_2O = HCl + HClO$.

The ferric hydroxid will be acted upon by the chlorin to form ferric oxychlorid and hypochlorous acid as follows:

(f) $2Fe(OH)_3 + 4Cl = Fe_2O_2Cl_2 + 2HClO + 2H_2O$.

The ferric oxychlorid will combine with more chlorin to form ferric chlorid and chlorin monoxid, as per formula:

(g) $Fe_2O_2Cl_2 + 8Cl = Fe_2Cl_6 + 2Cl_2O$.

The chlorin monoxid with water will form more hypochlorous acid as follows:

(h) $2Cl_2O + 2H_2O = 4HClO$.

It will be observed that we have a large per cent. of chlorin brought into and held in solution through the intervention of a small per cent. of iron and this chlorin is in the most available form for the purpose intended. Continued electrolysis will result in the formation of still more powerful oxidizing compounds as chloric acid and chlorin peroxid, the presence of which, in small amounts is hardly avoidable, but an excessive amount is undesirable and electrolysis should, therefore, cease as soon as the desirable limit of these compounds is reached. The solution thus formed becomes an active lixiviant, which is then directed into the agitator 22 where it is met by the previously ground ore preferably in the proportion of two parts of solution to one part of ore. Agitation hastens the reactions, but the process is not limited to that method of lixiviation. Percolation or continuous decantation can be practised, if desired, with the process as may best suit the operator without departing from the spirit of the invention. I usually find it preferable, however, to agitate the pulp which will yield a prompt and vigorous action. Sulfur is set free and will be found as a scum upon the surface of the mass. The copper of the ore is brought into the solution very quickly, the complete solution thereof depending upon the nature of the ore. Chalcocite will be decomposed very readily, chalcopyrite takes longer, and pyrite seems to be untouched or but very slightly attacked.

The copper will be found in the solution as cupric and as cuprous chlorids. The ferric chlorid will have been reduced to ferrous chlorid, but if there were any chlorates present the ferrous chlorid would be again raised to ferric condition, such action continuing as long as any chlorates remained. Since ferric chlorid is a most active solvent of copper compounds the advantage of having chlorates present is apparent.

Some sulfuric acid will be formed. Silver, if present, will be chloridized and a part of it will be found in the solution, held there by the solution of sodium chlorid. Gold will have been dissolved but reprecipitated by the ferrous salt, in such condition however, as to be readily removed by a subsequent treatment if the value thereof warrants it.

The copper bearing solution from the agitator 22 is run into the settling vat 26 and from there it is allowed to flow into the agitator or dewaterer 30 where it is met with a hot solution of sodium hydroxid, which comes from the vat 40 through the heated pipe 41. This hydroxid, it will be noted, is the product of decomposition of the sodium chlorid in the electrolysis. It will be found that after the sodium hydroxid is heated, as by means of the coil 42, before it is added to the solution, and the addition is made in an amount which is a chemical equivalent to the iron content of the solution (said iron being in the solution as ferrous or ferric chlorid) and the mass is agitated, the iron will be precipitated as ferric hydroxid and the copper in the solution as cupric chlorid will be reduced to cuprous chlorid. The reaction in this case is as follows:

$$FeCl_2 + CuCl_2 + 3NaOH = Fe(OH)_3 + CuCl + 3NaCl$$

and the NaCl holds the CuCl in solution. The amount of the sodium hydroxid thus first used is sufficient to precipitate the iron contained in the solution as ferric hydroxid. Other impurities of the solution, as for instance alumina will also have been precipitated with the iron. The clear copper solution is then directed into the agitator and dewaterer 32, while the precipitated iron may be removed from the agitator 30 and as much of it as is required may be elevated to the head of the system again and placed in the vat 7 for further use. The copper solution in the agitator 32, also, receives a hot solution of sodium hydroxid from the pipe 41 and the mass is agitated with the result that the copper is precipitated as cupric hydroxid. In this instance the heating of the sodium hydroxid is of supreme importance as, if the sodium hydroxid is added cold, it will precipitate the copper as a bulky, light blue precipitate of cupric hydroxid having the form $Cu(OH)_2$. If added hot, however, and in excess and the mass be agitated well, the copper will be precipitated with less combined water and in the form $3CuO.H_2O$. The reaction of sodium hydroxid when added cold with the cupric chlorid would be as follows:

(i)  $CuCl_2 + 2NaOH = Cu(OH)_2 + 2NaCl.$

But the heating of either one or both of the solutions, partly to the reaction, is productive of a different form of the oxid, dark brown in color and having the composition $3CuO.H_2O$, as stated above.

The last reaction shows that we have the sodium chlorid regenerated and ready for use again and it is allowed to flow from the agitator 32 through the pipe 35 into the vat 36, whence it may be pumped to the head of the system and into the storage vat 6, from which it originally started, for reuse in carrying out the method.

The copper solution having been cleared of its impurities in the agitator 30 yields a cupric hydroxid, which is now available, for melting into copper, or for the formation of the cathodes, for use in the electrolyzer cell, as heretofore set forth. The copper is precipitated as cupric hydroxid and remains such until it is treated for the preparation of the cathodes, by heating and driving off the water of hydration, as hereinafter explained. The use of the cupric oxid for that purpose is emphasized from the standpoint of efficiency of the electrolysis in the formation of the lixiviant, or active solution and the reduction to metallic copper at a less cost for the whole operation than would be the case if no depolarizer were used.

As to the precipitating box 44, by the use of such an arrangement the tailing can be thoroughly washed and the last traces of soluble copper removed therefrom. In using this precipitating box with its compartments having perforated bottoms and iron thereon, it is preferable to place pyrites in the first compartment thereof, for the purpose of reducing any ferric salts to a ferrous condition. The wash water must be of salt water for the purpose of keeping in solution the cuprous chlorid.

It will be observed that the solution can be used over and over again until the last of the copper is washed out of the tailing after which the wash water is led into vat 46 whence it may be pumped back into the tailing and returned in a cyclic manner through the precipitating box and the vat to the pump again. This solution of salt will contain iron as a ferrous chlorid in proportion to the amount of copper that it has taken from the tailing and it can finally be pumped to the head of the system and returned to the vat for use again. In the formation of the cathodes from the cupric oxid, the use of which is helpful in the economical carrying out of the method, the cupric hydroxid is preferably dried to about the condition of molders' sand and is pressed into any desired form.

To get the best result the copper hydroxid is taken in pulverized condition and mixed with a very small quantity of a solution of sodium hydroxid, sufficient only to give it the dampness of sand as used by the iron or brass molder. It is then pressed into cakes or slabs with an inlaid web of wire netting or expanded metal, as shown in Fig. 5 of the drawing. It is then dried and afterward heated in a muffle to about 600° F. This renders it hard and compact, and so that it will not be reduced to a pulp in the solution. The heating also drives off the remaining water of hydration.

The webbing offers the necessary support for the cathode and may be of iron as the solution of sodium hydroxid, in which it is used, does not attack the iron. The use of the metal web not only serves for the purpose of supporting the plate of cupric oxid, but is also of advantage in that it carries the current of electricity well within the cake of copper oxid, giving the hydrogen free play in all parts of the mass. Were it not for this arrangement the action of the current of electricity would be retarded as soon as a coating of copper was formed on the outside of the cake thereby preventing the access of the hydrogen to the copper oxid of the interior. The copper reduced by hydrogen is very pure and quite friable and, therefore, it can easily be removed from the web to be cast into ingots, or other marketable forms and the web may be used over again.

As to the silver, which is brought into the solution with the copper, it will be held in the solution by the sodium chlorid, from which it can be precipitated by metallic copper. The silver, which remained in the tailing, will be washed out by the solution of sodium chlorid, used for wash water and will be precipitated by the iron, with the copper in the precipitation box 44.

While I have taken ferric hydroxid as an example and a preferable means of supplying metal in the sodium solution used in the vat 7, I do not wish to be understood as limiting the process thereto since other metallic hydroxids may be employed, as for instance cupric hydroxid. It will, also, be understood that in the place of ferrous chlorid in the solution placed in the vat 7, I may use other metallic chlorids which are capable of being raised from a chlorid of a lower order to a chlorid of a higher order, the ferrous chlorid serving as a type of a metallic chlorid used in the manner described.

What is claimed is:

1. The method of extracting copper from its ores which consists in subjecting the ore to the action of a solution containing alkali metal chlorid, and a metallic chlorid capable of reduction to a lower chlorid, together with hypochlorous acid, then precipitating the copper from the solution, and then subjecting the solution to the action of free chlorin in the presence of a metallic hydroxid to regenerate the solution containing hypochlorous acid together with a metallic chlorid capable of reduction to a lower chlorid for use in a cyclic manner.

2. The method of extracting copper from its ores which consists in subjecting the ore to the action of a solution of sodium chlorid and chlorid of iron treated to furnish it with oxidizing agents, including ferric chlorid, together with a compound containing oxygen and chlorin, adding a metallic hydroxid to the solution and precipitating the copper from the solution and then subjecting the solution to the action of free chlorin to regenerate the solution containing ferric chlorid together with a compound containing oxygen and chlorin for use in a cyclic manner.

3. The method of extracting copper from its ores which consists in subjecting the ore to the action of a solution containing alkali metal chlorid, and a metallic chlorid capable of reduction to a lower chlorid, together with hypochlorous acid, then precipitating the copper from the solution, adding a metallic hydroxid to the solution and then subjecting the solution to the action of free chlorin to regenerate the solution containing hypochlorous acid and the aforesaid metallic chlorid capable of reduction to a lower chlorid.

4. The method of extracting copper from its ores which consists in dissolving the copper in a solution containing sodium chlorid and a chlorid of iron, treated to furnish it with oxidizing agents, separating the gangue from the solution, treating the solution with a soluble metallic hydroxid to separate ferric hydroxid, precipitating copper from the solution, then adding to the solution ferric hydroxid previously precipitated from the solution, and subjecting the solution to the action of free chlorin to regenerate the solution for use in a cyclic manner.

5. The method of extracting copper from its ores, which consists in dissolving the copper with a solution containing hypochlorous acid, alkali metal chlorid and ferric chlorid, separating the gangue from the solution, treating the solution with sodium hydroxid to precipitate excess of iron as ferric hydroxid, then precipitating copper from the solution and treating the remaining solution to regenerate the same for reuse of the solution in a cyclic manner.

6. The method of extracting copper from its ores, which consists in dissolving the copper with a solution containing sodium chlorid and a chlorid of iron, treated to furnish it with oxidizing agents, treating the resulting solution with a soluble metallic hydroxid to precipitate excess of iron, precipitating copper from the remaining solution, and treating the solution to regenerate the oxidizing agents for re-use of the solution in cyclic manner.

7. The process of extracting copper from its ores which consists in leaching the ore with a solution containing alkali metal chlorid, hypochlorous acid and ferric chlorid, treating the resulting solution with alkali metal hydroxid to produce ferric hydroxid together with alkali metal chlorid, precipitating the copper from the solution, subjecting the solution to the action of free chlorin to raise the ferrous salt therein to the ferric state, adding to the solution ferric hydroxid previously precipitated from the solution, and again subjecting the solution to the action of free chlorin in the presence of such ferric hydroxid, to produce hypochlorous acid and ferric chlorid, for repetition of the process.

8. The process of extracting from its ores a metal forming chlorids soluble in alkali metal chlorid, which consists in leaching the ore with a solution containing free hypochlorous acid, together with alkali metal chlorid and a metallic chlorid capable of reduction to a lower chlorid, adding alkali metal hydroxid to the solution to precipitate metallic hydroxid, then precipitating from the solution the metal to be extracted, then subjecting the solution to the action of free chlorin and adding to the solution during such operation the metallic hydroxid previously produced.

9. The process of extracting from its ores a metal forming chlorids soluble in alkali metal chlorid, which consists in leaching the ore with a solution containing alkali metal chlorid, together with a metallic chlorid capable of reduction to a lower chlorid, adding alkali metal hydroxid to the solution to precipitate metallic hydroxid, precipitating from the solution the metal to be extracted, then subjecting the solution to the action of free chlorin, and adding to the solution during such operation metallic hydroxid previously precipitated.

10. The method of extracting copper values, which comprises treating the materials carrying the values with a solution of sodium chlorid which carries a dissolving agent in active form, and thereby converting the copper content of said materials into copper chlorid, separating the solution from the gangue, reacting upon the copper chlorid with sodium hydroxid whereby copper hydroxid is precipitated and sodium chlorid is regenerated and separating the precipitate from the solution.

11. The method of extracting copper values from sulfid ores, which comprises dissolving the values in a sodium chlorid solution furnished with hypochlorous acid and ferric chlorid for liberating the sulfur and taking up said values, separating the gangue from the solution, separating the values from the solution and returning substantially the whole sodium chlorid solution for use again in cyclic manner.

12. The method of extracting copper values, which comprises converting the copper content of the substance into copper chlorid, by dissolving the values in a sodium chlorid solution furnished with active chlorin liberated therein, separating the impurities from the solution by first treating the same with sodium hydroxid, in sufficient quantity only, to accomplish such separation, then further treating the solution with sodium hydroxid for precipitating the values and converting the copper chlorid into copper hydroxid, and regenerating the sodium chlorid for further use in cyclic manner.

13. The method of extracting copper values, which comprises treating the copper bearing substance with an alkali chlorid solution having ingredients which will dissolve the values, treating the copper carrying solution with an alkali hydroxid developed in the process of forming said solution, first for separating the impurities therefrom then using more of said alkali hydroxid and thereby precipitating the values and regenerating the alkali chlorid of the original solution, separating the values from the solution and returning substantially the whole solution in a cyclic manner.

14. The method of extracting copper values, which comprises treating the copper bearing substance with a solution furnished with agents which will dissolve the values, treating the solution containing the values with a heated reagent in an amount equivalent to the impurities in said solution, for separating the impurities therefrom, further treating the solution with a heated reagent for precipitating the values and regenerating the first solution separating the values from the solution and returning substantially the whole solution in a cyclic manner.

15. The method of extracting copper values, which comprises converting the copper content into copper chlorid in a sodium chlorid solution furnished with dissolving ingredients, carrying the copper chlorid in the sodium chlorid solution, separating the solution from the gangue, reacting upon the copper chlorid with sodium hydroxid whereby copper hydroxid is precipitated and sodium chlorid regenerated, separating the precipitate from the solution and returning substantially the whole solution in a cyclic manner.

16. The method of extracting copper values, which comprises converting the copper content into copper chlorid, in a sodium chlorid solution furnished with dissolving agents, carrying the copper chlorid in said sodium chlorid solution, treating the said solution with a quantity of sodium hydroxid, which is a chemical equivalent of the impurities of the solution, to separate the said impurities therefrom, further treating the solution with sodium hydroxid for reacting upon the copper chlorid whereby copper hydroxid is precipitated and sodium chlorid is regenerated, separating the copper hydroxid from the solution and returning the whole in a cyclic manner.

17. The method of extracting copper values, which comprises converting the copper content into copper chlorid, carrying the copper chlorid in a sodium chlorid solution, treating the said solution with sodium hydroxid only sufficient to separate the impurities from the solution, then further treating the solution with sodium hydroxid for reacting upon the copper chlorid whereby copper hydroxid is precipitated and sodium chlorid is regenerated, drying the copper hydroxid to form copper oxid, converting the copper oxid into metallic copper and returning the sodium chlorid solution for further use in a cyclic manner.

18. The method of extracting copper values, which comprises the circulating of a sodium chlorid solution furnished with oxidizing agents and chlorin yielding compounds, for oxidizing the substances and dissolving the values, treating the said solution with a sufficient amount of an alkaline hydroxid for separating impurities from the solution, further treating the solution with a sufficient amount of an alkaline hydroxid for precipitating the values, said latter action also regenerating the sodium chlorid solution for use again.

19. The method of extracting metallic values from materials in which sulfur compounds are present or not comprising the treating of said materials with a solution furnished with hypochlorous acid, and ferric chlorid, whereby the materials are oxidized and any sulfur present is liberated and whereby the metallic values are dissolved, treating the value carrying solution with a heated solution of an alkali metal hydroxid, first in sufficient quantity to separate impurities from said solution and then further treating the value carrying solution with a second portion of the heated solution of alkali metal hydroxid for separating the values therefrom.

20. The method of extracting copper values comprising the treatment of copper bearing substances with a solution furnished with hypochlorous acid, and ferric chlorid, whereby the materials will be oxidized and the copper values converted into copper chlorid, and then treating the copper carrying solution with a second solution containing sodium hydroxid in sufficient quantities to separate the impurities therefrom and further treating the copper carrying solution with said second solution for converting the copper chlorid into copper hydroxid.

21. The method of extracting copper values comprising the treatment of copper bearing substances with a solution furnished with hypochlorous acid and ferric chlorid whereby the materials may be oxidized and the copper values converted into copper chlorid, then treating the copper carrying solution with sodium hydroxid in sufficient quantities to separate the impurities therefrom and further treating the copper carrying solution with said sodium hydroxid for converting the copper chlorid into copper hydroxid.

In testimony whereof, I have hereunto set my hand, in presence of two witnesses.

HENRY B. SLATER.

Witnesses:
CASSELL SEVERANCE,
EARLE R. POLLARD.

Copies of this patent may be obtained for five cents each, by addressing the "Commissioner of Patents, Washington, D. C."

dissolving the values, treating the said solution with a sufficient amount of an alkaline hydroxid for separating impurities from the solution, further treating the solution with a sufficient amount of an alkaline hydroxid for precipitating the values, said latter action also regenerating the sodium chlorid solution for use again.

19. The method of extracting metallic values from materials in which sulfur compounds are present or not comprising the treating of said materials with a solution furnished with hypochlorous acid, and ferric chlorid, whereby the materials are oxidized and any sulfur present is liberated and whereby the metallic values are dissolved, treating the value carrying solution with a heated solution of an alkali metal hydroxid, first in sufficient quantity to separate impurities from said solution and then further treating the value carrying solution with a second portion of the heated solution of alkali metal hydroxid for separating the values therefrom.

20. The method of extracting copper values comprising the treatment of copper bearing substances with a solution furnished with hypochlorous acid, and ferric chlorid, whereby the materials will be oxidized and the copper values converted into copper chlorid, and then treating the copper carrying solution with a second solution containing sodium hydroxid in sufficient quantities to separate the impurities therefrom and further treating the copper carrying solution with said second solution for converting the copper chlorid into copper hydroxid.

21. The method of extracting copper values comprising the treatment of copper bearing substances with a solution furnished with hypochlorous acid and ferric chlorid whereby the materials may be oxidized and the copper values converted into copper chlorid, then treating the copper carrying solution with sodium hydroxid in sufficient quantities to separate the impurities therefrom and further treating the copper carrying solution with said sodium hydroxid for converting the copper chlorid into copper hydroxid.

In testimony whereof, I have hereunto set my hand, in presence of two witnesses.

HENRY B. SLATER.

Witnesses:
CASSELL SEVERANCE,
EARLE R. POLLARD.

Copies of this patent may be obtained for five cents each, by addressing the "Commissioner of Patents, Washington, D. C."

---

Correction in Letters Patent No. 1,195,616.

It is hereby certified that in Letters Patent No. 1,195,616, granted August 22, 1916, upon the application of Henry B. Slater, of Riverside, California, for an improvement in "Methods of Extracting Metals from Their Ores," an error appears in the printed specification requiring correction as follows: Page 5, line 40, for the word "partly" read *party;* and that the said Letters Patent should be read, with this correction therein that the same may conform to the record of the case in the Patent Office.

Signed and sealed this 24th day of October, A. D., 1916.

[SEAL.]

F. W. H. CLAY,
*Acting Commissioner of Patents.*

Correction in Letters Patent No. 1,195,616.

It is hereby certified that in Letters Patent No. 1,195,616, granted August 22, 1916, upon the application of Henry B. Slater, of Riverside, California, for an improvement in "Methods of Extracting Metals from Their Ores," an error appears in the printed specification requiring correction as follows: Page 5, line 40, for the word "partly" read *party;* and that the said Letters Patent should be read with this correction therein that the same may conform to the record of the case in the Patent Office.

Signed and sealed this 24th day of October, A. D., 1916.

[SEAL.]
F. W. H. CLAY,
*Acting Commissioner of Patents.*